United States Patent [19]

Nakajima et al.

[11] Patent Number: 4,754,208
[45] Date of Patent: Jun. 28, 1988

[54] CIRCULAR PATH CONTROL APPARATUS AND METHOD FOR MULTI-AXIS SERVOMECHANISMS

[75] Inventors: Tatsuya Nakajima, Fujisawa; Yasushi Miura, Yokohama, both of Japan

[73] Assignee: Nippon Kokan Kabushiki Kaisha, Tokyo, Japan

[21] Appl. No.: 76,224

[22] Filed: Jul. 22, 1987

[30] Foreign Application Priority Data

Nov. 17, 1986 [JP] Japan .................................. 61-271718
Feb. 24, 1987 [JP] Japan .................................. 62-39264

[51] Int. Cl.⁴ ............................................. G05B 19/23
[52] U.S. Cl. ................................. 318/574; 318/572; 318/570; 318/602; 318/632; 364/176
[58] Field of Search ............... 318/574, 572, 570, 602, 318/632; 364/176

[56] References Cited

U.S. PATENT DOCUMENTS 4,707,780  11/1987  Gose et al. ......................... 318/632

Primary Examiner—William M. Shoop, Jr.
Assistant Examiner—Saul M. Bergmann
Attorney, Agent, or Firm—Fleit, Jacobson, Cohn & Price

[57] ABSTRACT

A circular path control apparatus and method for a multi-axis servomechanism having a plurality of driving shafts. Any disturbance to a command circular path is calculated from the amount of contour error of a circular path or a square of a circular-arc center angle error and a control for cancelling the disturbance is added, thereby improving the circular path accuracy of the multi-axis servomechanism.

2 Claims, 8 Drawing Sheets

FIG. I
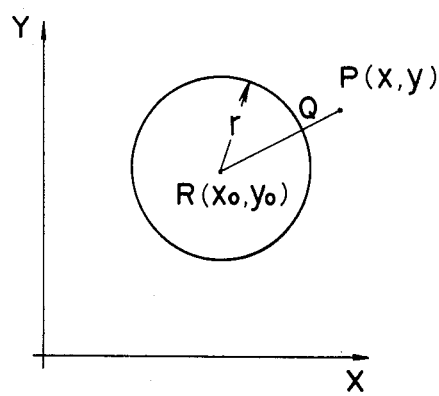
FIG. 3
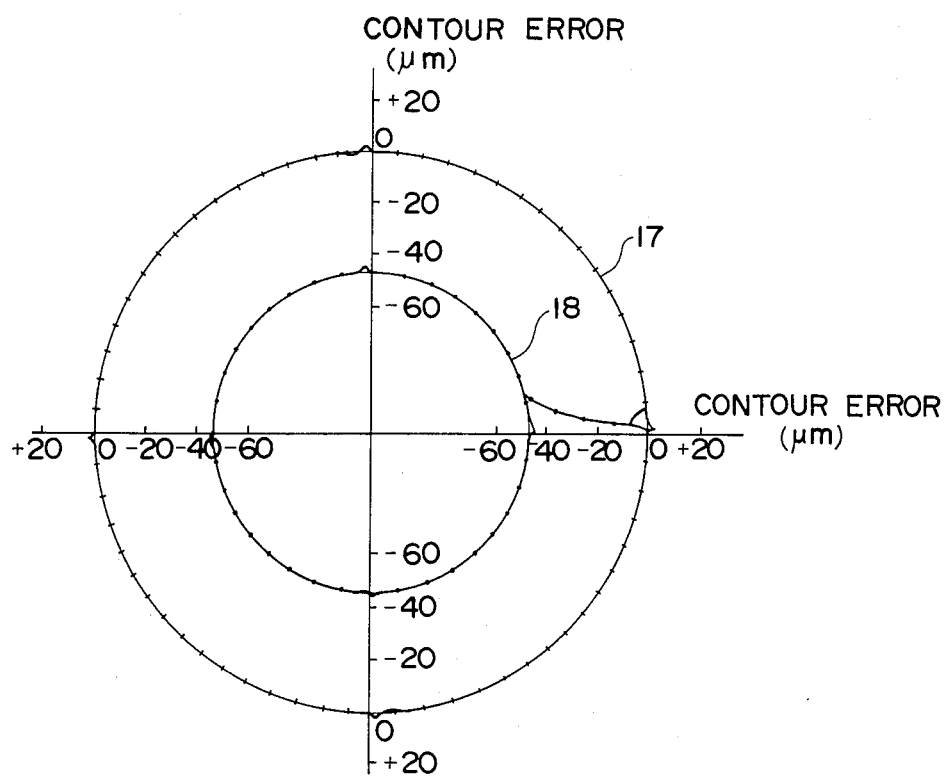

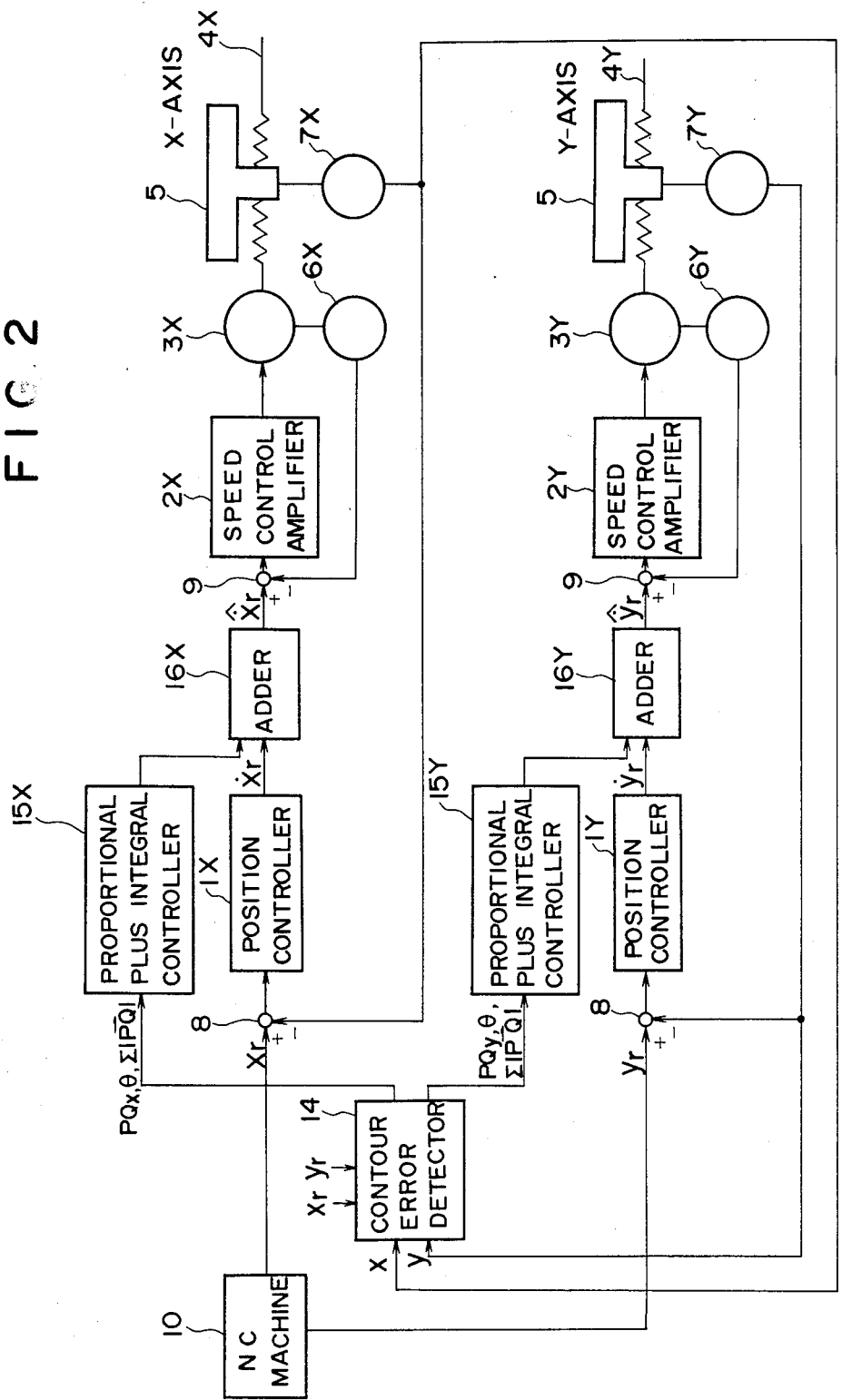

CIRCULAR PATH CONTROL APPARATUS AND METHOD FOR MULTI-AXIS SERVOMECHANISMS

BACKGROUND OF THE INVENTION

1. Field of the Invention

The present invention relates to a circular path control apparatus and method for improving accuracy of the circular path of a multi-axis servomechanism for use with NC machine tools, laser processing machines, etc.

2. Description of the Prior Art

With a multi-axis servomechanism for use with NC machine tools, laser processing machines, etc., it is essential to minimize the amount of path error in the path control of a tool in order to ensure an excellent processing accuracy.

In a known type of control apparatus for multi-axis servomechanisms used with numerically controlled machines, the desired tool path control is effected by producing a position command for each shaft as a function of time, detecting the present position of each shaft by a position detector and independently controlling each shaft by a variable-value control employing a feedback control.

However, this type of path control for the multi-axis servomechanism is disadvantageous in that the control is independently effected by providing the desired value as a function of time for each shaft so that in the case of a high-speed feed drive of a circular path, even if the servo characteristics of the driving shafts are the same, their delays in response are not the same due to the variations in rate of change of command value among the shafts and an error is caused between a command circular path and the actual response path, thereby making it impossible to ensure an excellent processing accuracy.

In an attempt to solve these problems, a command generating method for multi-axis servo systems is disclosed in Japanese Patent Laid-Open No. 60-231207. The method disclosed in this publication is designed so that in the case of a multi-axis servomechanism involving two or more axes, a position command and a speed command for the principal shaft is generated as a function of time and a position command and speed command for the auxiliary shaft are generated as functions of the condition of the principal shaft.

However, this command generating method for multi-axis servomechanism is disadvantageous in that the positions and speeds of the auxiliary shaft are stored as function values of the positions of the principal shaft and thus a control apparatus must have a huge memory capacity.

SUMMARY OF THE INVENTION

It is the primary object of the invention to provide a circular path control apparatus and method for multi-axis servomechanisms which overcome the foregoing deficiencies in the prior art circular path control for multi-axis servomechanisms and are capable of cancelling any error between a command circular path and the actual circular path, thereby improving the circular path accuracy.

In accordance with one aspect of the invention, there is provided a circular path control apparatus for a multi-axis servomechanisms in which a contour error of a circular path is fed back and subjected to proportional plus integral control for each of the driving shafts, thereby improving the response of the circular path control.

In accordance with another aspect, there is provided a circular path control apparatus for a multi-axis servomechanism in which a quantity proportional to a square of the center angle error between a command position and a response position is added to a speed command signal for each driving shaft, thereby reducing the path error of a circular path.

In accordance with the invention, the amount of disturbance applied in the radial direction of a command circular path is fed back for each driving shaft to correct the speed command of each driving shaft, thereby greatly improving the path accuracy of a circular path.

Also, in accordance with the invention, since there is no need to preliminarily store the positions and speeds of the auxiliary shaft corresponding to the condition of the principal shaft for the purpose of effecting the path control, there is the effect of considerably reducing the necessary memory capacity.

The above and other objects, features and advantages of the invention will become more clear from the following description taken in conjunction with the accompanying drawings.

BRIEF DESCRIPTION OF THE DRAWINGS

FIG. 1 is a diagram showing the operating principle of a first embodiment of the invention.

FIG. 2 is a block diagram showing the construction of the embodiment of FIG. 1.

FIGS. 3 and 4 are contour error distribution diagrams for the embodiment of FIG. 1.

DETAILED DESCRIPTION OF THE PREFERRED EMBODIMENTS

Before describing preferred embodiments of the invention, a conventional circular path control apparatus for a multi-axis servomechanism will be described with reference to FIGS. 10, 11 and 12. For purposes of simplification, the description will be made with reference to a servomechanism having two axes, i.e, X and Y axes.

Figure 10:
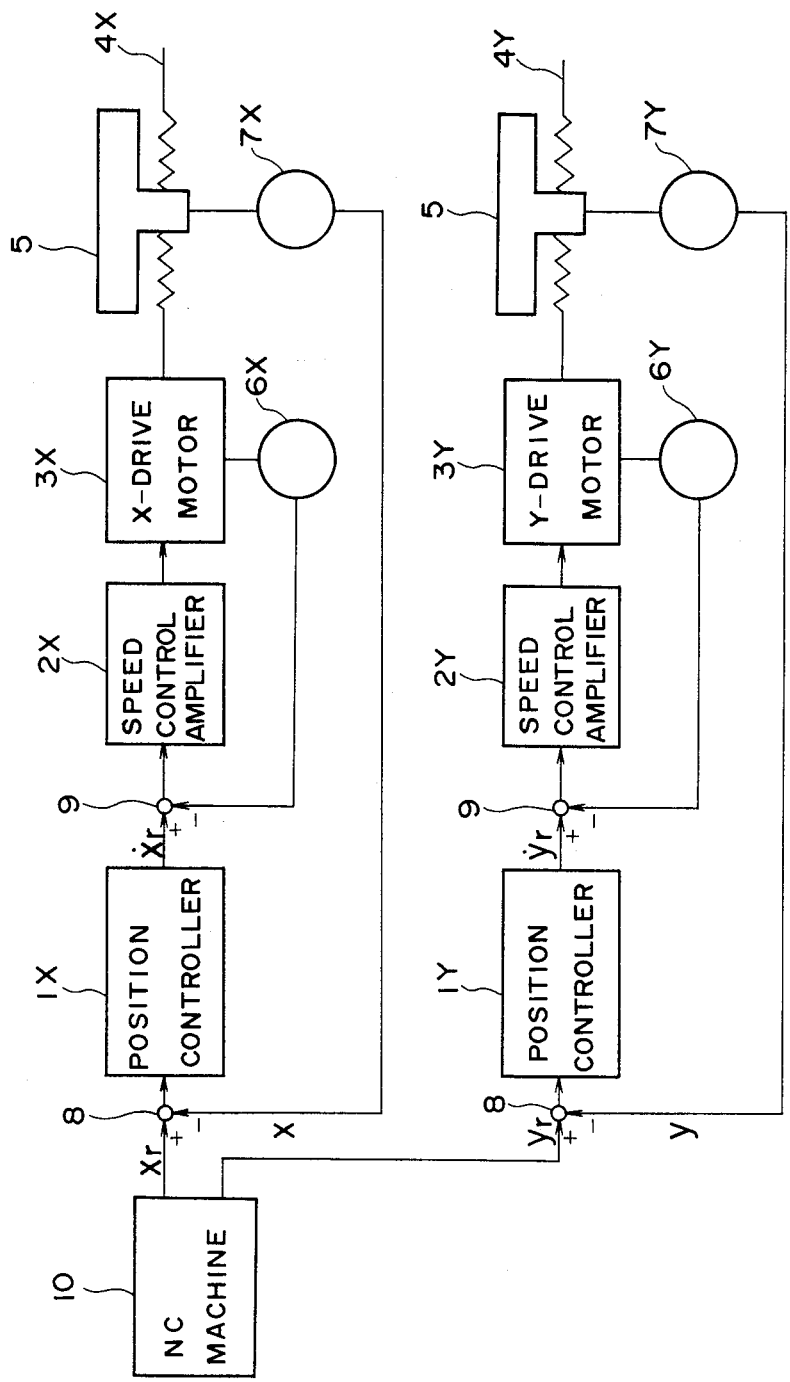
FIG. 10 is a block diagram showing the construction of a prior art apparatus.

In FIG. 10, numerals IX and IY respectively designate X-axis and Y-axis position controller, 2X and 2Y speed control amplifiers for driving and controlling an X-drive motor 3X and a Y-drive motor 3Y, respectively, and 4X and 4Y feed screws for respectively moving a table 5 in the X-axis and Y-axis directions.

Numerals 6X and 6Y designate tachometer generators for respectively detecting the rotation speeds of the X-drive motor 3X and the Y-drive motor 3Y, 7X and 7Y pulse generators for respectively detecting the X-direction and Y-direction positions of the table 5, and 8 and 9 adders.

With the two-axis servomechanism constructed as described above, an X-axis position command $x_r$ and a Y-axis position command $y_r$ from an NC machine 10 are respectively sent to the position controllers 1X and 1Y through the adders 8 so that in accordance with the position commands $x_r$ and $y_r$ the position controllers 1X and 1Y respectively calculate and send an X-axis speed command $\dot{x}_r$ and a Y-axis speed command $\dot{y}_r$ to the speed control amplifiers 2X and 2Y through the adders 9. In accordance with the given speed commands $\dot{x}_r$ and $\dot{y}_r$ the speed control amplifiers 2X and 2Y respectively drive the X-drive motor 3X and the Y-drive motor 3Y to control the position of the table 5. At this time, the tachometer generators 6X and 6Y respectively detect and feed back the rotation speeds of the X-driver motor 3X and the Y-drive motor 3Y and the pulse generators 7X and 7Y respectively detect and feed back the X-direction and Y-direction response position x and y of the table 5.

Figure 11:
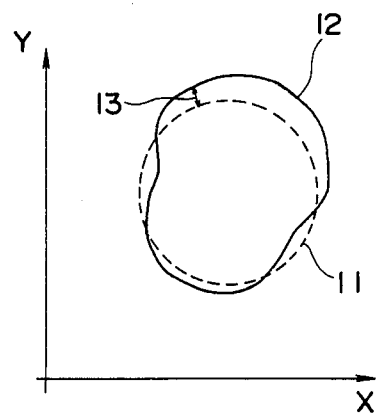
FIGS. 11 and 12 are diagrams each showing an error between a command circular path and the actual response path according to the prior art apparatus.
Figure 12:
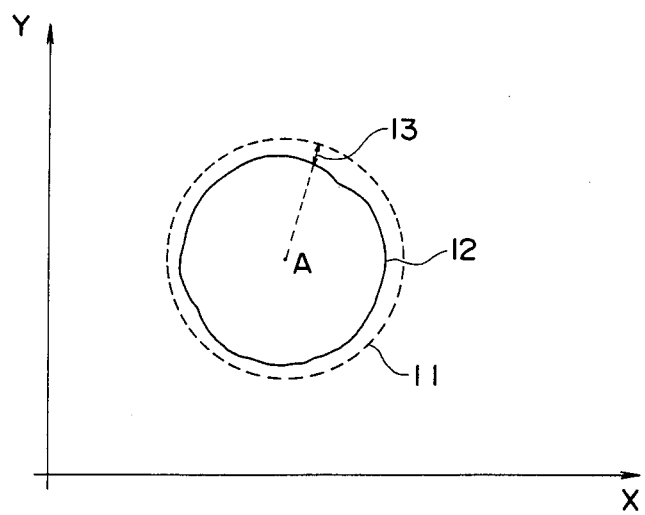

In the multi-axis servomechanism constructed as described above, due to the fact that the control is effected independently for each shaft using a time as a parameter, in the case of a high-speed feed drive of a circular path or the like, even if the servo characteristics of the driving shafts are the same, an error 13 is caused between a command circular path 11 and the actual response path 12 since their delays in response are not the same due to the difference in rate of change of command value among the driving shafts as shown in FIG. 11 or 12, thus failing to ensure an excellent processing accuracy.

Referring now to FIGS. 1, 2, 3 and 4, a first embodiment of the invention will be described.

The principle of a multi-axis servomechanism circular path control according to this embodiment will be described first with reference to a two-axis servomechanism including X and Y axes.

In FIG. 1, numeral 11 designates a given command path forming a circle having a radius r extending from the center or a point R of coordinates (Xo, Yo). ALso, symbol P represents a moving point of the orthogonal two-axis servomechanism and (X, Y) represents the coordinates of the Point P. Assuming now that Q represents a point at which the straight line connecting the point P and the center R of the command circular path 11 and the command circular path 11 cross each other, the resulting contour error vector $\vec{PQ}$ between the command circular path 11 and the point P on the actual response path by the orthogonal two-axis servomechanism is given by the following equation $$PQ = \begin{bmatrix} PQx \\ PQy \end{bmatrix} = \begin{bmatrix} (Xo + r\cos\theta) - x \\ (yo + r\sin\theta) - y \end{bmatrix} \quad (1)$$

where $\theta = \tan^{-1}\dfrac{y - y_o}{x - x_o}$

Here, in order to reduce the path error to zero, it is only necessary to control in such a manner that the absolute value of the contour error vector $\vec{PQ}$ is always reduced to zero. Thus, by using the contour error vector $\vec{PQ}$ as a feedback quantity and performing a proportional plus integral control, it is possible to improve the path accuracy.

In other words, a drive speed value $\hat{x}_r$ for driving in X-direction and a driving speed value $\hat{y}_r$ for driving in the Y-direction are determined as shown by the following equations.

$$\hat{x}_r = \dot{x}_r + K_{x1}\cdot PQ_x + K_{x2}\cos\theta\cdot\Sigma|\vec{PQ}| \quad (2)$$

$$\hat{y}_r = \dot{y}_r + K_{y1}\cdot PQ_y + K_{y2}\sin\theta\cdot\Sigma|\vec{PQ}| \quad (3)$$

Here, $\dot{x}_r$ and $\dot{y}_r$ respectively denote speed command values determined in accordance with an X-axis position command $x_r$ and a Y-axis position command $y_r$ and $\Sigma|\vec{PQ}|$ denotes an accumulated contour error amount. Also, Kx1, Kx1, Kyr and Ky2 denote proportionality factors.

In the above equations (2) and (3), the second terms in the right members indicate the proportional controls using the contour errors PQx and PQy as feedback quantities and the third terms in the right members indicate the integral controls using the contour errors as feedback quantities.

A first embodiment of the invention shown by the block diagram of FIG. 2 will now be described. In the Figure, numerals 1 to 10 designate the same components as used in the conventional apparatus shown in FIG. 10. Numeral 14 designates a contour error detector for determining contour errors PQx and PQy, a cumulative contour error $\sigma|\vec{PQ}|$ and an angle $\theta$, 15X and 15Y proportional plus integral controllers for respectively performing the calculation of the second and third terms in the right members of the above equations (2) and (3) in accordance with the outputs of the contour error detector 14, and 16X and 16Y adders.

With the servomechanism circular path control apparatus constructed as described above, the X-direction position x and Y-direction position y of the moving table 5 are detected and sent to the contour error detector 14 from the pulse generators 7X and 7Y, respectively, and various values including contour errors PQx and PQy, a cumulative contour error $\Sigma|\vec{PQ}|$ and an angle $\theta$ are calculated in accordance with the positions x and y and the X position command $x_r$ and Y position command $y_r$ sent from the NC machine 10.

The contour errors $PQ_x$ the cumulative contour error $\Sigma|\vec{OQ}|$ and the angle $\theta$, detected by the contour error detector 14, are sent to the X-axis proportional plus integral controller 15X and similarly the contour error $PQ_y$, the cumulative contour error $\Sigma|\vec{PQ}|$ and the angle $\theta$ are sent to the Y-axis proportional plus integral controller 15Y.

In accordance with the inputted contour error $PQ_x$ and $PQ_y$ and other values, the proportional plus integral controllers 15X and 15Y perform the necessary proportional plus integral calculations and send the results of the calculations to the adders 16X and 16Y, respectively. The adder 16X produces the sum of an X-axis speed command $\dot{x}_r$ calculated in accordance with the position command $x_r$ by the position controller 1X and the calculated value obtained by the proportional plus integral controller 15X and the adder 16Y produces the sum of a Y-axis speed command $\dot{y}_r$ calculated in accordance with the position command $y_r$ by the position controller 1Y and the calculated value obtained by the proportional plus integral controller 15Y, thereby respectively calculating driving speed values $\hat{x}_r$ and $\hat{y}_r$ which respectively reduce the X-axis component and Y-axis component of the contour errors to zero. The driving speed values $\hat{x}_r$ and $\hat{y}_r$ are respectively sent to the speed control and amplifiers 2X and 2Y through the respective adders 9 so that the X-drive motor 3X and the Y drive motor 3Y are operated, thereby controlling the position of the table 5.

Figure 4:
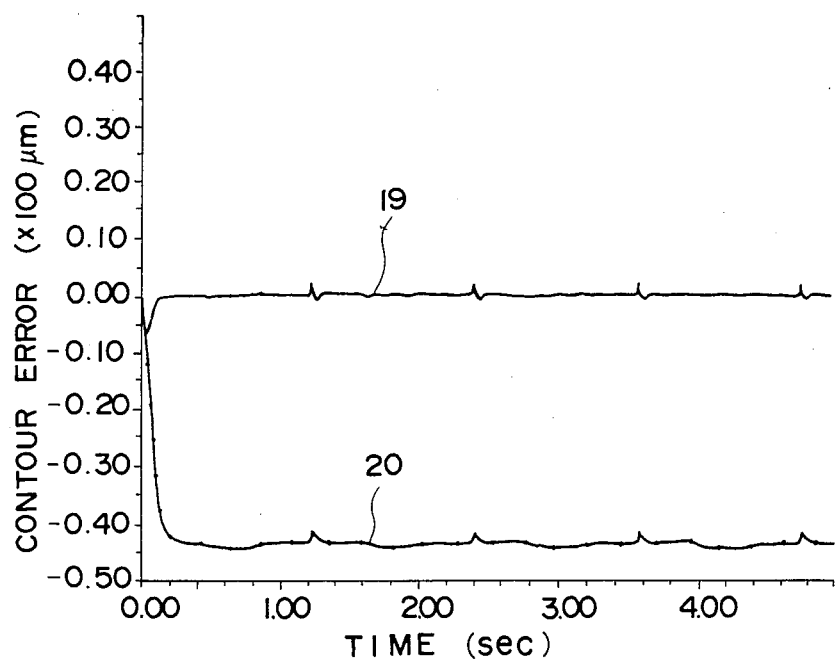

FIGS. 3 and 4 show the contour errors resulting from a computer-simulated circular path control performed in accordance with the above-described embodiment, using a circular radium of 50 mm, feed speed of 4 m/min, and the proportional factors shown in equations (2) and (3) of $K_{x1}=30$, $K_{x2}=0.5$, $K_{y1}=30$ and $K_{y2}=0.5$. In FIG. 3 in which the abscissa represents the X-direction contour error and the ordinate represents the Y-direction contour error thereby showing the contour error at each of various positions on the circular paths, numeral 17 designates the contour errors according to this embodiment and numeral 18 designates the contour errors according to the conventional apparatus.

Also, in FIG. 4 in which the abscissa represents the driving time (in seconds) and the ordinate represents the contour error thereby showing the manner in which the contour error varies with the driving time, numeral 19 shows the contour errors in the case of this embodiment and numeral 20 shows the contour errors in the case of the conventional apparatus.

As will be seen from FIGS. 3 and 4, the contour errors in the case of this embodiment are reduced considerably as compared with those in the case of the conventional apparatus and the path accuracy is improved.

A second embodiment of the invention will now be described with reference to FIGS. 5 to 9.

Figure 5:
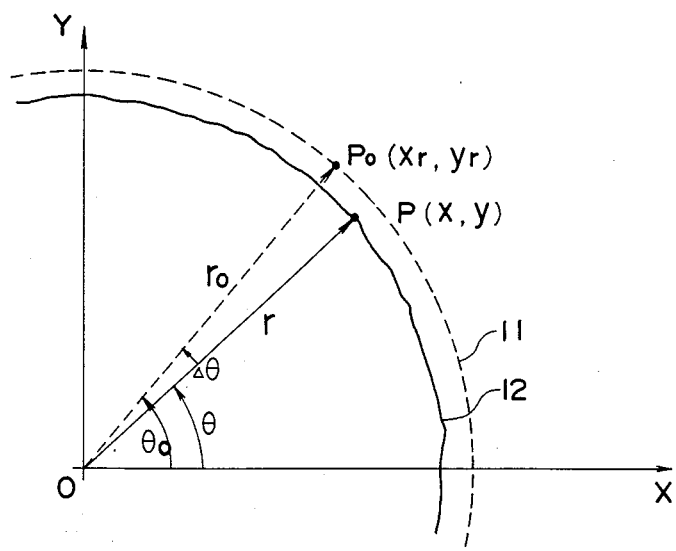
FIG. 5 is a diagram showing the operating principle of a second embodiment of the invention.

The principle of the second embodiment will be described first on the basis of a two-axis servomechanism including X and Y axes as shown in FIG. 5.

In the Figure, a command path 11 forms a circular arc having a radius $r_o$ whose center is the coordinate origine O, and numeral 12 designates a response path corresponding to the command path 11. Assume now that $\theta_o$ represents the angle formed by the radius of a command position $P_o(x_r, Y_r)$ on the command path 11 and the X-axis or center angle, r the radius of a response position P (x,y) on the response path 12, $\theta$ the center angle formed by the radius r and the X-axis, and $\Delta\theta$ a center angle error $\theta_o - \theta$ between the command position $P_o$ and the response position P.

Then, as for example, a proportional controller is generally used for each of the position controllers 1X and 1Y used in the conventional control apparatus shown in FIG. 10 so that if their proportional gains are represented by Kp, then the outputs of the proportional controllers or the X-direction command speed $\dot{x}_r$ and the Y-direction command speed $\dot{y}_r$ at the response position P(x,y) are given by the following equations $$\dot{x}_r = K_p(x_r - x) \quad (4)$$

$$\dot{y}_r = K_p(y_r - y) \quad (5)$$

Considering the conversion to the polar coordinate system of the command speeds $\dot{x}_r$ and $\dot{y}_r$ given in terms of the rectangular coordinate system, a radial command speed $\dot{r}_{ref}$ at the response position P (x,y) is given by the following equation $$r_{ref} = \frac{1}{r}(x \cdot x_r + y \cdot y_r) \quad (6)$$

By substituting equations (4) and (5) in equation (6) for conversion to the polar coordinate system, we obtain $$r_{ref} = \frac{K_p}{r}\{x(x_r - x) + y(y_r - y)\}$$
$$= K_p\{r_o\cos(\theta - \theta_o) - r\}$$
$$\approx K_p\left[r_o\left\{1 - \frac{1}{2}(\Delta\theta)^2\right\} - r\right]$$

Therefore, the radial command speed $\dot{r}_{ref}$ is given by the following equation $$r_{ref} \approx K_p(r_o - r) - \frac{1}{2} K_p r_o (\Delta\theta)^2 \quad (7)$$

Figure 6:
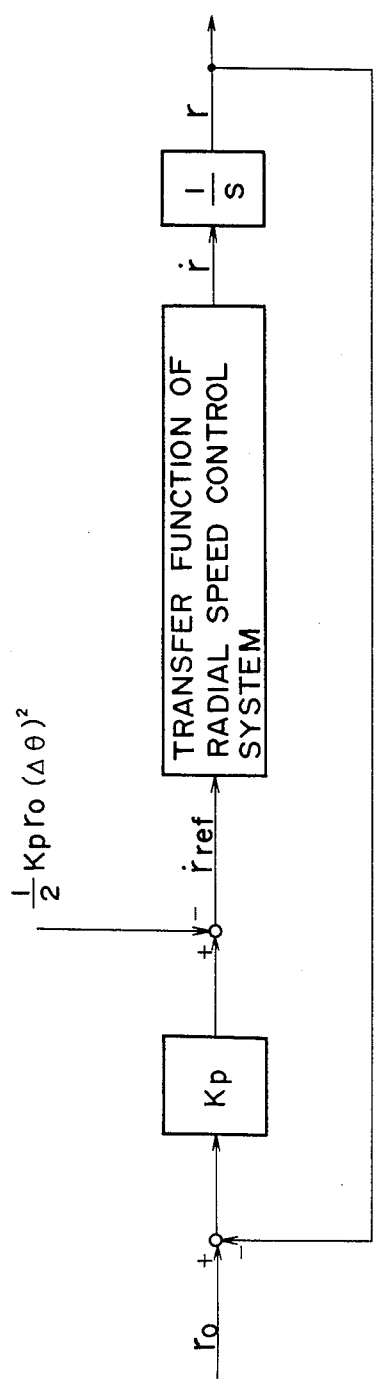
FIG. 6 is a block diagram of the control system in the second embodiment.

Conceiving a block diagram for the control system relating to the radial direction in consideration of the above equation (7), the one shown in FIG. 6 results. In other words, the control system for the radial direction takes the form of the system of the command value $r_o$ of a constant value plus a disturbance of $-K_p r_o(\Delta\theta)^2/2$. Therefore, the response value r deviates from the command value $r_o$ and this deviation is a path error.

Thus, by detecting the center angle error $\Delta\theta$ of the response position P on the basis of the following equation (8)

$$\Delta\theta = \theta_o - \theta \quad (8)$$
$$= \tan^{-1}\frac{y_r}{x_r} - \tan^{-1}\frac{y}{x}$$

and using the detected center angle error $\Delta\theta$ and adding the value of $u_r$ of the following equation (9) to the radial command speed $\dot{r}_{ref}$ $$u_r = \frac{1}{2} K_p r_o (\Delta\theta)^2 \quad (9)$$

it is possible to cancell the disturbance and thereby reduce the path error.

By converting the value of $u_r$ obtained from the above equation (9) to the othogonal coordinate system (x,y) from the polar coordinate system (r,$\theta$), it is possible to obtain an X-axis component $u_r$ and a Y-axis component $u_r$ are given by the following equations (10) and (11)

$$u_x = \frac{1}{2} K_p r_o (\Delta\theta)^2 \cos\theta \quad (10)$$

$$u_y = \frac{1}{2} K_p r_o (\Delta\theta)^2 \sin\theta \quad (11)$$

By adding the values of $u_x$ and $u_y$ respectively to the command speeds $\dot{x}_r$ and $\dot{y}_r$ shown in equations (4) and (5), respectively, it is possible to improve the circular path accuracy. In other words, X-axis and Y-axis speed command values $\hat{\dot{x}}_r$ and $\hat{\dot{y}}_r$ are determined by the following equations (12) and (13)

$$\hat{\dot{x}}_r = \dot{x}_r + \frac{1}{2} K_p r_o \cos\theta \cdot (\Delta\theta)^2 \quad (12)$$

$$\hat{\dot{y}}_r = \dot{y}_r + \frac{1}{2} K_p r_o \sin\theta \cdot (\Delta\theta)^2 \quad (13)$$

In each of equations (12) and (13), the second term in the right member represents the proportional control using the square of the circular-arc center angle error $\Delta\theta$ as a feedback quantity.

Figure 7:
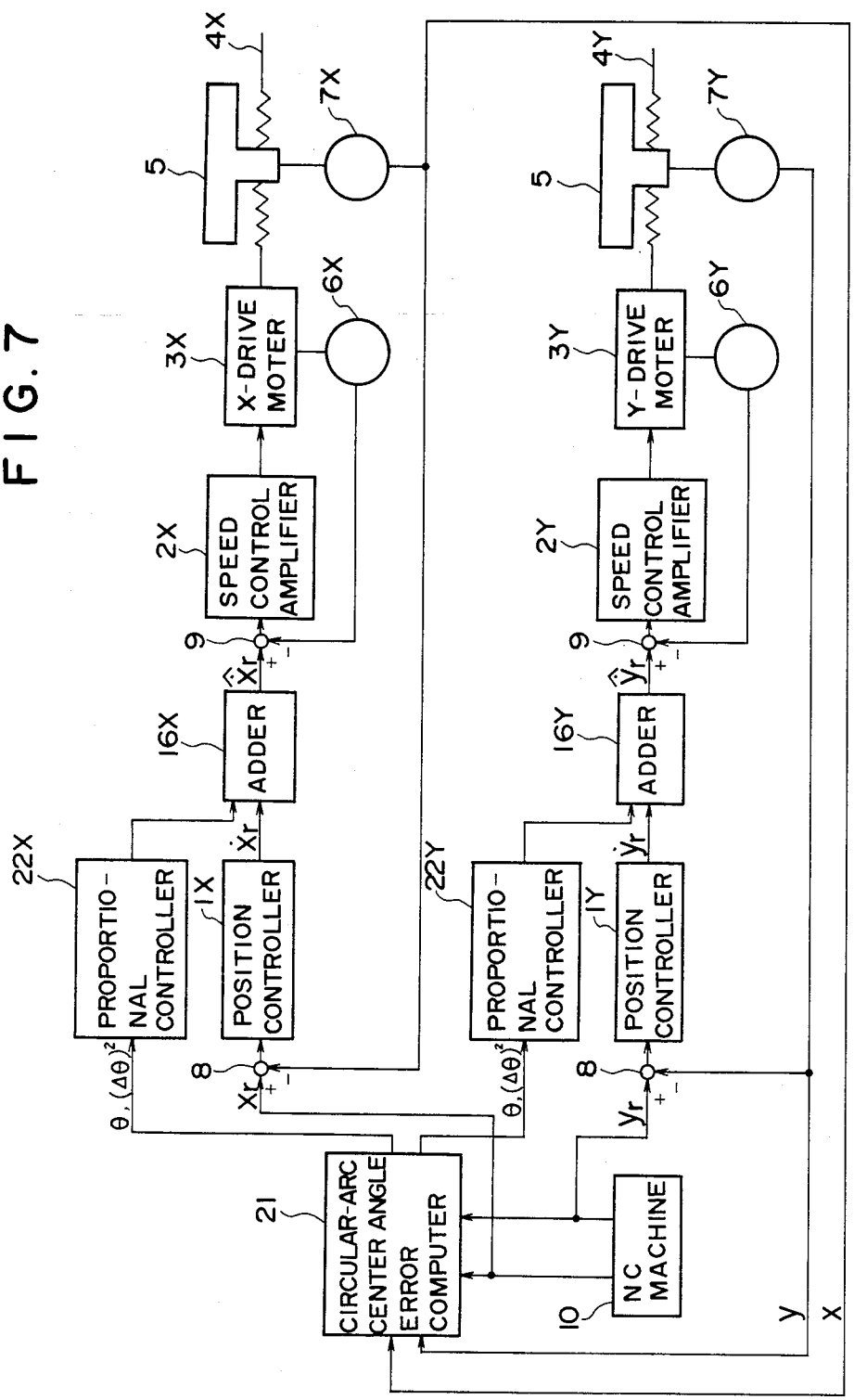
FIG. 7 is a block diagram showing the construction of the second embodiment.

FIG. 7 is a block diagram of this embodiment based on the above-described principle and in the Figure numerals 1X to 10 are the same with their counterparts in the embodiment of FIG. 1. Numeral 21 designates a circular-arc center angle error computer for determining a circular-arc center angle error $\Delta\theta$, a square $(\Delta\theta)^2$ of circular-arc center angle error and a center angle $\theta$ of response position P in accordance with the above-mentioned equation (8), and 22X and 22Y proportional controllers for respectively calculating the second terms in the right members of equations (12) and (13) in accordance with the square $(\Delta\theta)^2$ of circular-arc center angle error and the center angle $\theta$ of response position P generated from the circular-arc center angle error computer 21.

With the circular path control apparatus for servomechanisms constructed as described above, the x-direction position x and Y-direction position y of the moving table 5 are respectively detected and sent by the pulse generators 7X and 7Y to the circular-arc center angle error computer 21 so that in accordance with these response positions x and y and the X position command $x_r$ and Y position command $y_r$ sent from the NC machine, the center angle $\theta$ of the response position P and a circular-arc center angle error $\Delta\theta$ are calculated and also a square $(\Delta\theta)^2$ of the circular-arc center angle error is calculated. The center angle and the square $(\Delta\theta)^2$ of circular-arc center angle error, calculated by the circular-arc center angle error computer 21, are sent to the X-axis and Y-axis proportional controllers 22X and 22Y so that in accordance with these values the proportional controllers 22X and 22Y respectively perform proportional calculations of the second terms in the right members of equations (12) and (13) and send the results obtained to the adders 16X and 16Y. The adder 16X produces the sum of an X speed command $\dot{x}_r$ calculated in accordance with the position command $x_r$ and the response position x by the position controller 1X and the computed value obtained by the proportional controller 22X, and the adder 16Y produces the sum of a Y speed command $\dot{y}_r$ calculated in accordance with the position command $y_r$ and the response position y by the position controller 1Y and the computed value obtained by the proportional controller 22Y, thereby respectively calculating speed command values $\hat{x}_r$ and $\hat{y}_r$ for reducing the X-axis component and Y-axis component of a circular contour error to zero. The speed command values $\hat{x}_r$ and $\hat{y}_r$ are respectively sent to the speed control amplifiers 2X and 2Y through the adders 9 and the X-drive motor 3X and the Y-drive motor 3Y are controlled, thereby controlling the position of the table 5.

Figure 8:
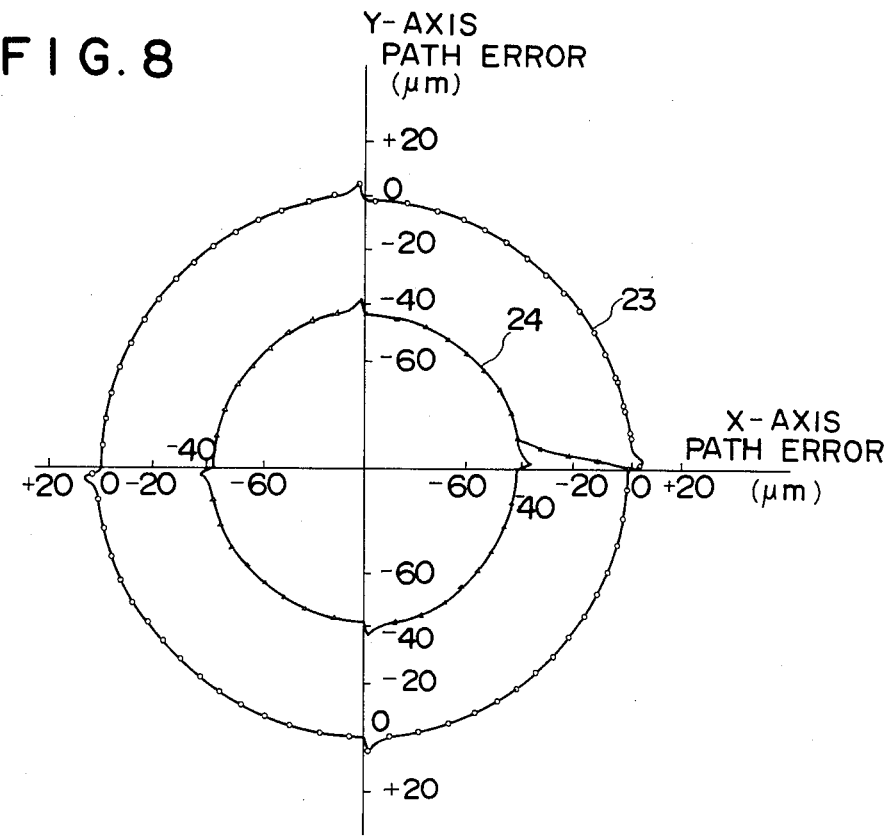
FIG. 8 and 9 are contour error distribution diagrams for the second embodiment.
Figure 9:
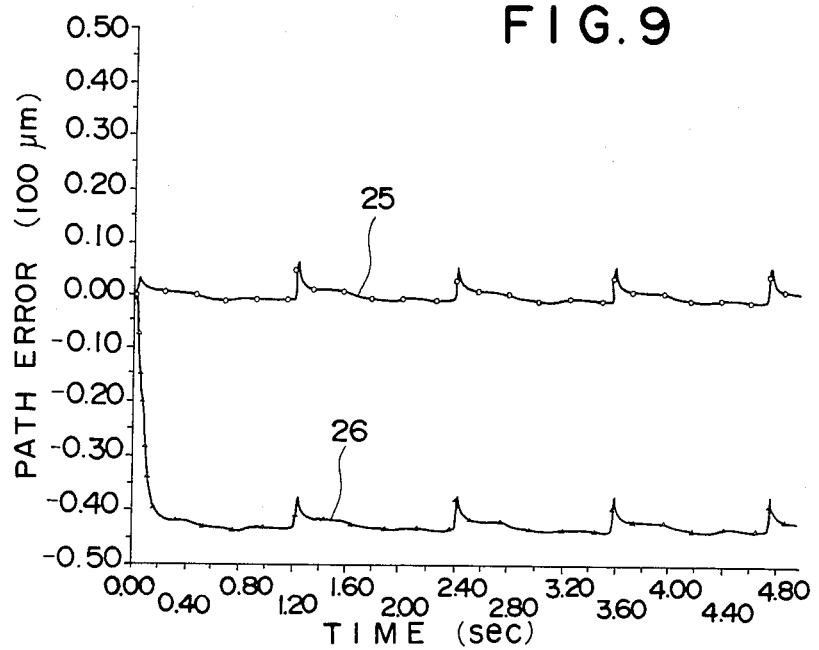

FIGS. 8 and 9 show the contour errors resulting from a computer-simulated circular path control in accordance with the above-described embodiment, using a circular radius of 50 mm and a feed speed of 4 m/min, selecting the gains Kp of the position controllers 1X and 1Y to be 30 (1/sec.) and using the same servo characteristics for the X and Y axes. In FIG. 8 showing the path errors at various positions on the circular paths as in the case of FIG. 3, numeral 23 designates the path errors according to this embodiment and numeral 24 designates the path errors according to the conventional apparatus shown in FIG. 10.

Also, in FIG. 9 in which the abscissa represents the driving time (in seconds) and the ordinate represents the path error thereby showing the variations of the path error with the driving time, numeral 25 designates the case of this embodiment and numeral 26 designates the case of the conventional apparatus.

As will be seen from FIGS. 8 and 9, the present embodiment has the effect of reducing the amount of path error greatly as compared with that of the conventional apparatus and thereby improving the path accuracy.

While, in the above-described embodiments, the invention has been described as applied to the case of a two-axis servomechanism, the invention is equally applicable to the case of a three-axis servomechanism as these embodiments.

We claim:

1. In a circular path control apparatus for an orthogonal multi-axis servomechanism including, for each of a plurality of driving shafts of said servomechanism, a position signal adder, a position controller, a speed signal adder, a speed control amplifier, a drive motor, a rotation speed detector for said drive motor, and a position detector, said position signal adder calculating a difference between a command position signal and a present position signal of each said driving shaft, said position controller being responsive to a signal sent from said position signal adder to calculate a driving shaft speed command signal, said speed signal adder calculating a difference between said speed command signal calculated by said position controller and a driving shaft present speed signal detected by said drive motor rotation speed detector, and said speed control amplifier being responsive to a signal sent from said speed signal adder to rotate said drive motor, the improvement comprising:

a contour error detector;

a proportional plus integral controller and adder means which are additionally provided for each said driving axis;

said contour error detector calculating a contour error vector from a response position on a command circular path and a response position on a response circular path, a cumulative absolute value of said contour error vector, and an angle made by each said driving shaft with a vector extending to said response position from a center of rotation;

said proportional plus integral controller for each said driving shaft calculating a correction quantity by multiplying a corresponding shaft direction component value of said contour error vector by a constant and multiplying a product of said cumulative absolute value of said contour error vector and a cosine value of said angle made by each said driving shaft and said last-mentioned vector by another constant; and said adding means for each said driving shaft produces a sum of said correction quantity and the speed command signal from said position controller and applying the same as an input to said speed signal adder.

2. A circular path control apparatus for an orthogonal multi-axis servomechanism including, for each of a plurality of driving shafts of said servomechanism, a position signal adder, a position controller, a speed signal adder, a speed control amplifier, a drive motor, a drive motor rotation speed detector, and a position detector, said position signal adder calculating a difference between a command position and a present position signal of each said driving shaft, said position controller calculating a driving shaft speed command signal in response to a signal sent from said position signal adder, said speed signal adder calculating a difference between said speed command signal calculated by said position controller and a driving shaft present speed signal detected by said drive motor rotation speed detector, and said speed control amplifier rotating said drive motor in response to a signal sent from said speed signal adder, the improvement comprising:
- a circular-arc center angle error detector; and
- a proportional controller and adding means provided additionally for each driving shaft;
- said circular-arc center angle error detector calculating a circular-arc center angle error from a command position on a command circular path and a response position on a response circular path, the square of said circular-arc center angle error, and an angle made by each said driving shaft with a vector extending to said response position from a center of rotation:
- said proportional controller calculating a correction quantity for each said driving shaft speed command as a quantity proportional to a product of said square of circular-arc center angle error and a cosine of said angle made by each said driving shaft with said last-mentioned vector; and
- said adding means producing a sum of said correction quantity and the speed command signal from said position controller and applying the same as an input to said speed signal adder.

* * * * *